(12) United States Patent
Heath et al.

(10) Patent No.: US 7,984,000 B2
(45) Date of Patent: Jul. 19, 2011

(54) PREDICTING AND USING SEARCH ENGINE SWITCHING BEHAVIOR

(75) Inventors: Allison P Heath, Houston, TX (US); Ryen William White, Kirkland, WA (US); Christopher J. C. Burges, Bellevue, WA (US); Eric David Brill, Redmond, WA (US); Robert L Rounthwaite, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 818 days.

(21) Appl. No.: 11/959,453

(22) Filed: Dec. 18, 2007

(65) Prior Publication Data

US 2009/0112781 A1  Apr. 30, 2009

Related U.S. Application Data

(60) Provisional application No. 60/983,997, filed on Oct. 31, 2007.

(51) Int. Cl.
*G06F 15/18* (2006.01)
*G06F 15/16* (2006.01)
*G06E 1/00* (2006.01)

(52) U.S. Cl. ............................. 706/20; 706/21; 709/245

(58) Field of Classification Search ..................... 706/20
See application file for complete search history.

(56) References Cited

U.S. PATENT DOCUMENTS

| | | | |
|---|---|---|---|
| 6,470,269 B1 | 10/2002 | Adar et al. | |
| 7,149,743 B2 | 12/2006 | Colwill | |
| 2003/0105589 A1 | 6/2003 | Liu et al. | |
| 2004/0177081 A1 | 9/2004 | Dresden | |
| 2005/0071465 A1 | 3/2005 | Zeng et al. | |
| 2005/0192936 A1 | 9/2005 | Meek et al. | |
| 2006/0074883 A1 | 4/2006 | Teevan et al. | |
| 2006/0224579 A1 | 10/2006 | Zheng | |
| 2006/0259861 A1* | 11/2006 | Watson .......................... | 715/705 |
| 2007/0073663 A1 | 3/2007 | McVeigh et al. | |
| 2007/0100822 A1 | 5/2007 | Freeman et al. | |
| 2007/0208730 A1 | 9/2007 | Agichtein et al. | |

FOREIGN PATENT DOCUMENTS

| | | |
|---|---|---|
| EP | 1580670 A1 | 9/2005 |
| EP | 1708105 A1 | 10/2006 |

OTHER PUBLICATIONS

Juan, "An Analysis of Search Engine Switching Behavior using Click Streams", 2005.*
International Search Report and Written Opinion Received for PCT Application No. PCT/US2008/075727, mailed on Feb. 6, 2009, 12 pages.

(Continued)

*Primary Examiner* — David R Vincent
*Assistant Examiner* — Nathan H Brown, Jr.
(74) *Attorney, Agent, or Firm* — L. Alan Collins; Collins & Collins Incorporated

(57) ABSTRACT

Aspects of the subject matter described herein relate to predicting and using search engine switching behavior. In aspects, switching components receive a representation of user interactions with at least one browser. The switching components derive information from the representation that is useful in predicting whether a user will switch search engines. The derived information and information about a user's current interaction with a browser is then used by a switch predictor to predict whether the user will switch search engines. This prediction may be used in a variety of ways examples of which are given herein.

18 Claims, 5 Drawing Sheets

OTHER PUBLICATIONS

Juan, et al., "An Analysis of Search Engine Switching Behavior Using Click Streams", 14th international conference on World Wide Web. ACM 2005, pp. 9.

Telang, et al., "An Empirical Analysis of the Antecedents of Internet Search Engine Choice", Graduate School of Industrial Administration, 1999, p. 1.

Adar, et al., "Why We Search: Visualizing and Predicting User Behavior", Proceedings of the 16th international conference on World Wide Web, ACM 2007, pp. 10.

Downey, et al., "Models of searching and browsing: Languages, studies and application", Proceedings of the International Joint Conference on Artificial Intelligence, 2007. pp. 8.

White, et al., "Investigating behavioral variability in Web search". Proceedings of the 16th World Wide Web Conference, 2007, pp. 21-30.

White, et al., "Enhancing Web Search by Promoting Multiple Search Engine Use", Submitted for acceptance to World Wide Web Conference'08 on Nov. 1, 2007, pp. 10.

* cited by examiner

PREDICTING AND USING SEARCH ENGINE SWITCHING BEHAVIOR

CROSS REFERENCE TO RELATED APPLICATION

This application claims the benefit of U.S. Provisional Application No. 60/983,997, filed Oct. 31, 2007, entitled PREDICTING AND USING SEARCH ENGINE SWITCHING BEHAVIOR, which application is incorporated herein in its entirety.

BACKGROUND

Users of the World Wide Web can choose among a number of commercial Web search engines when performing information seeking activities. The decision of a user to select one engine over another may be based on a range of factors that include reputation, familiarity, retrieval effectiveness, and interface usability.

Switching from one search engine to another is typically very easy. For example, a user may type in the address of another search engine, select a bookmark that references the other search engine, search using the name of the other search engine, and so forth. When users permanently or even temporarily switch from one Web search engine to another, this may cause a revenue loss to one Web search engine and a revenue gain to another Web search engine. Thus, Web search engine providers are very interested in minimizing switches from and maximizing switches to their search engine.

SUMMARY

Briefly, aspects of the subject matter described herein relate to predicting and using search engine switching behavior. In aspects, switching components receive a representation of user interactions with at least one browser. The switching components derive information from the representation that is useful in predicting whether a user will switch search engines. The derived information and information about a user's current interaction with a browser is then used by a switch predictor to predict whether the user will switch search engines. This prediction may be used in a variety of ways, examples of which are given herein.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
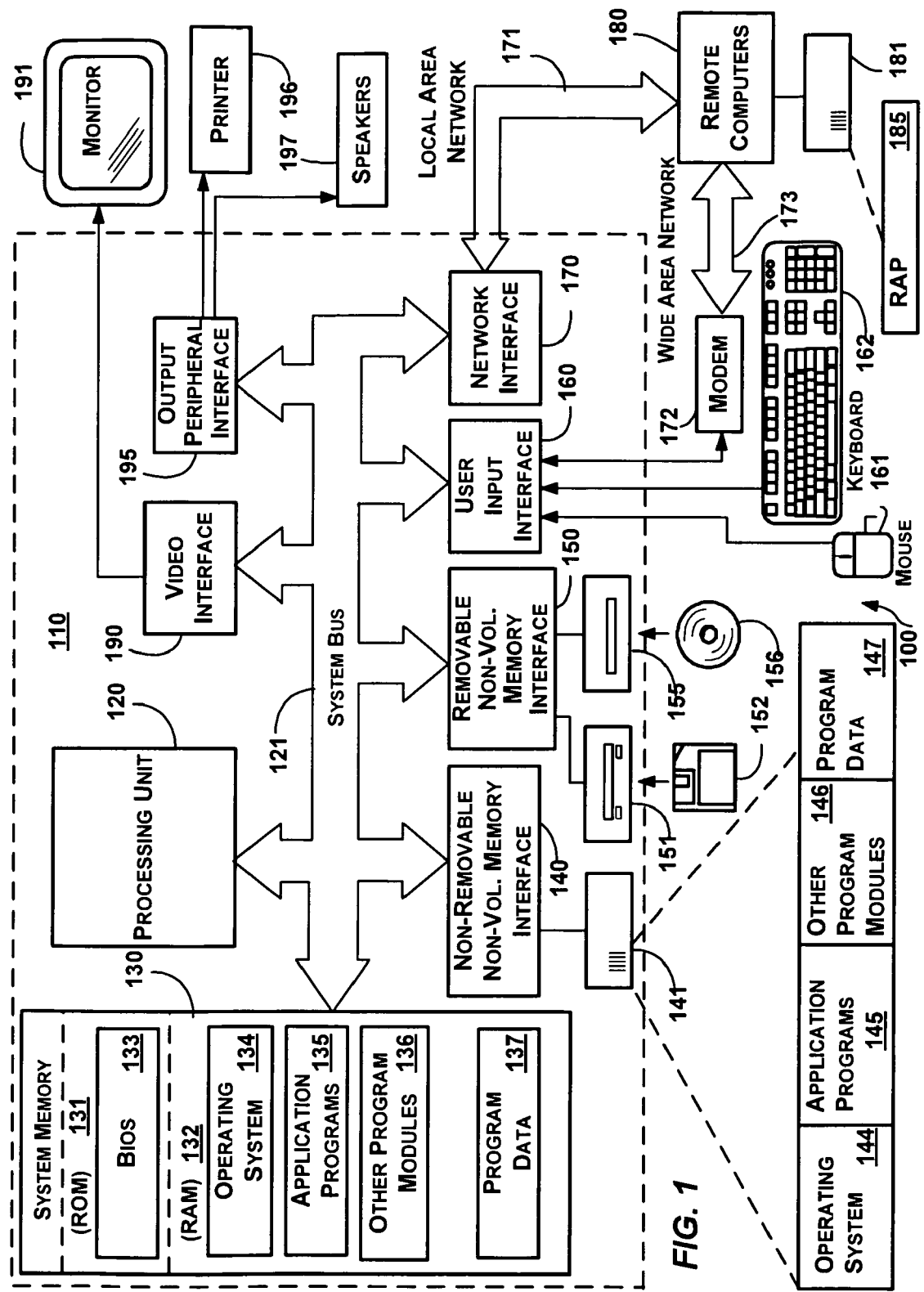
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Predicting and Using Search Engine Switching

As mentioned previously, Web search engine providers often obtain revenue as a result of the number of users that use their search engines. When a user switches from one search engine to another, this translates into a loss and gain of revenue by the two search engine providers involved. Aspects of the subject matter related herein correspond to predicting when a switch will occur and using this prediction for various purposes.

According to a study performed by the inventors associated with this application, during a three month period, 50% of the users studied used the same search engine for all of their queries while the other 50% switched search engines some time during the period. Furthermore, most multi-engine users had a preferred engine that they used to conduct most of their searches. Hereafter, a switch from one search engine to another is sometimes referred to simply as a "switch." A switch may be characterized by any of the following behaviors:

1. Performing a query with a different search engine than the previous query;
2. Navigating to a homepage of a different search engine;
3. Querying for a different search engine name (e.g., submitting a query for "Google" to Live Search).

Based on the teachings herein, those skilled in the art may recognize other behaviors that characterize a switch. Such other characterizations may also be used without departing from the spirit or scope of aspects of the subject matter described herein.

Although when querying for a different search engine name the user has not yet used the different search engine, this may be a good indication that the user has already made the decision to switch (i.e., at that moment the underlying intent to switch is prevalent), and it may be difficult to dissuade users from doing so. Mistakenly typing queries/URLs into a toolbar plugin may also cause a "switch", although such switches are erroneous and the user may not have intended for this to happen.

From the study above, the inventors determined patterns in interaction leading up to a switch. Some of these patterns include, for example, increased query length, viewing multiple search engine result pages, revisitation of previously-viewed pages, and so forth. There are at least three classes of search engine switching behavior:

1. Erratic switching: Users switch between Web search engines for almost every search and may use multiple engines concurrently. Such switches may be linked to a desire for coverage, the use of multiple Web browser tabs, and the use of applications that automatically submit queries to multiple engines simultaneously.
2. Short-term or "bursty" switching: Users switch engines for individual search sessions of groups of sessions, but generally return to their preferred engine for most of their searching. Switches of this nature may occur because a user feels that a particular search engine is better suited for the current task. For example, the recent improvements to the Image Search feature on Live Search may have encouraged Google or Yahoo! users to switch to Live Search for image-related queries.
3. Long-term switching or "defection": Users switch from one search engine to another and rarely return to the original engine. This appears to represent a change in their search engine preference. Such switches—sometimes referred to as "defections"—have profound business importance as this represents a lost customer and a potential erosion of query share.

Although some exemplary classes of switching behavior have been given above, other classes may be apparent to those skilled in the art. In an embodiment, such other classes may be used without departing from the spirit or scope of aspects of the subject matter described herein.

Predicting switches between Web search engines may be useful, among other things, to individual users in real-time and for search engine designers for estimating when their system is likely to perform well and when it is likely to perform poorly given streams of interaction log data from which switching probabilities for particular queries (or across all queries) can be estimated. Predicting switching can be valuable, for example, if a search engine company does not have access to logs informing the company of whether users actually switched engines. Predicting and using search engine switching behavior may also be valuable for a number of other reasons. Aspects of the subject matter described herein include how:

1. User behavior patterns can be represented as a string-based "gene" representation, and that these patterns are useful for characterizing search behaviors.
2. Described prediction models can estimate with reasonable accuracy when a user is going to switch from one Web search engine to another.
3. Client- or server-side mechanisms can offer new interfaces and/or ranking algorithms based on the probability of a switch to a given Web search engine or from a given Web search engine.
4. Switching can be used as a metric to evaluate Web search engine performance for a given query or across all queries.
5. Personalized prediction models can be developed for each user and each query.
6. Longer-term search engine defections (e.g., going from Google to Yahoo permanently or for an extended period of time) can be ameliorated by better understanding why users shift from one search engine to another and building functionality to address the issues that seem to encourage defection.

Predicting Search Engine Switching

Search sessions may be extracted from the temporally-ordered query logs separated out by user based on a unique identifier assigned to a particular session or instantiation of a browser plugin such as a toolbar. From these logs, search sessions may be extracted that form the basis of predicting search engine switching.

A session is defined as a consecutive series of Web pages visited by a user that lie on a hyperlink trail originating with a click on a search engine result page and ending with the user performing an activity assumed unrelated to the current search (e.g., returning to their Web browser's homepage). Sessions may be extracted from interaction logs using a procedure similar to that described by White, R. W. and Drucker, S. M. (2007) Investigating behavioral variability in Web search. In *Proceedings of the 16th World Wide Web Conference*, pp. 21-30, which reference is hereby incorporated herein with respect to extracting sessions. Sessions can contain multiple queries submitted to multiple Web search engines. In the study mentioned previously, approximately 8% of all search sessions contained a switch between two or more engines.

The pages and activities that lie in a session may be converted from the raw log format into textual strings. In this representation, Web pages and user actions are encoded as individual characters and combined into a string representing a search session to make processing, pattern matching, and pattern identification easier. Pages viewed on the trails and actions users exhibit are represented based on their type. Tables 1 and 2 shown below contain the letters used for actions and pages, respectively.

TABLE 1

Representation of user actions.

| Actions | Meaning |
|---------|---------|
| Q | Query Performed |
| S | Clicked on result |
| C | Clicked on non-result link |
| N | Going back one page |
| G | Going back more than one page |
| V | Navigated to new page |
| Y | Switched search engine |

TABLE 2

Representation of pages visited.

| Pages | Meaning |
|---|---|
| R | First results page view (short) |
| D | First results page view (medium) |
| H | First results page view (long) |
| I | Other results page view (short) |
| L | Other results page view (medium) |
| K | Other results page view (long) |
| P | Page view (short) |
| E | Page view (medium) |
| F | Page view (long) |

A page is preceded by an action (e.g., a query comes before every result page view). The dwell time thresholds (in seconds) for "short", "medium", and "long" were generated based on a tripartite division of the pages viewed based on the amount of time they were being viewed by a user in the Web browser. That is, to determine the dwell time thresholds, the amount of time that all users spent on all pages in the interaction logs is computed, these times are sorted in ascending order, and the resulting list of times is split into three groups—"short", "medium", and "long"—with the only proviso that no group contains the same display times (e.g., range for short pages [0s,5s], range for medium pages [6s,20s], range for long pages [21s,1800s]). A page is assigned to a group based on where its time lies.

The string representation allows for patterns of interaction to be compared within and between users and queries. In addition, it may be used to scrub any identifying information about the user from the logs, protecting privacy while preserving the salient aspects of user interaction used for predictive analyses. For example, the following stream of user interactions may be encoded in a way that makes them comparable over many users, regardless of the query issued or pages navigated to subsequently:

```
Time    Log-entry 1 - http://www.google.com/q=msn+shopping&start=0   (encoded as "QD")
        Log-entry 2 - http://www.google.com/q=zune+80gb&start=0      (encoded as "QD")
        Log-entry 3 - http://www.google.com/q=zune+80gb&start=10     (encoded as "QL")
        Log-entry 4 - http://www.google.com/q=zune+80gb&start=0      (encoded as "QR")
        Log-entry 5 - http://www.live.com/q=zune+80gb&start=0        (encoded as "YH")
        Log-entry 6 - http://www.yahoo.com/q=zune+80gb&start=0       (encoded as "YD")
```

In the representation used herein, this session may be encoded as the string "QDQDQLQRYHYD," wherein the meaning of each letter is described in either table 1 and 2 and the text following those tables.

As will be described in greater detail below, the semantically richer encoding described above may be used to identify behavioral patterns. In addition, the encoding may also be used to predict changes in the Web search engine used.

In the remainder of this section is presented a method useful for the prediction of search engine switches. The method uses the encoding above to do binary prediction about future actions. The method takes a parameter n which represents the number of characters in the past that it considers when performing prediction. It also takes a parameter m which is the number of characters in the future on which the prediction is performed (i.e., the character distance between the prediction being made and the switch actually occurring). For example, in the case of action/page session strings, m is equal to 2 in order to predict the next action. The method may also be adjusted to predict whether the action to predict happens within the next m characters. The method is initialized with a list of previously seen strings of length n and the number of times the action to predict resulted (positive) or did not result (negative) after this string was seen. This information is kept in a positive/negative counts table. The method may be started with no previously seen information.

The method then takes the n most recent characters of the session and looks up in the positive/negative counts table to see the number of times this string resulted in a positive or negative result. If the string has never been seen before, the overall more frequent result is predicted as the result. Otherwise, the ratio between positive and negative results for this string is calculated. If the ratio is larger than a supplied parameter p, then a positive prediction is given, otherwise a negative prediction. Once the predicted character is seen, if it is positive, then one is added to the positive counts for that string, otherwise one is added to the negative counts for that string. In this way, the information the method draws on is updated as new data arrives.

Below is an example of the technique.

Example: Given the string representation of the search session shown above (i.e., "QDQDQLQRYHYD"), the goal is to predict using the method described above whether or not a switch is going to occur. To do this, substrings from within the session are isolated and used to predict whether a switch occurs after those substrings. With the complete session string above, we are able to illustrate successes and failures at predicting search engine switches. For illustrative purposes, set n=5, m=2, and p=0.5.

Initialization. Initialization occurs independent from and prior to the session where the prediction occurs. Initialization is a training step used to assign a weight to each n-length substrings based on prior observations about whether switches did or did not occur after them. Sessions extracted from an existing source of user behavior data can be used to initialize the positive and negative counts for each substrings of length n. The ratio of positive counts to negative counts compared with a pre-determined threshold (0.5 in this case) is used in the prediction set that follows to decide whether a switch is predicted. If a switch occurs within m characters of the end of the string then "positive counts" is incremented by one; otherwise "negative counts" is incremented by one.

Some example data is shown in the table below. It is again noted that the table below is not connected to the session for which a prediction is desired; rather, in one embodiment, the table is computed across many or all sessions for a large number of users to establish an initial likelihood estimate for each string sequence.

Initial Positive/Negative Counts Table

| String | Positive Counts | Negative Counts |
|---|---|---|
| QRYHY | 1 | 0 |
| QLQRY | 1 | 0 |
| QDQDQ | 2 | 3 |
| QRQRQ | 1 | 5 |
| ... | ... | ... |

In another embodiment, the table above may be computed using just the interactions from the individual user for which switch prediction is desired. This allows a form of "personalized" switch prediction. The substrings above may be generated using a large set of prior sessions with the user, for example.

Prediction. Prediction most often occurs in real-time during the session where the prediction occurs. Now, the positive and negative counts computed during the Initialization step may be used to predict switches for the session encoded as defined previously (i.e., "QDQDQLQRYHYD"). To illustrate the performance of the algorithm under a variety of conditions, three scenarios are presented below where the algorithm is used to predict whether a switch is going to occur at different points in this search session. Note that although a complete session is encoded in this example, operationally the algorithm would only have access to the previous n user actions/pages.

In the first example, the algorithm predicts a switch after "QDQDQ." This is an example of an incorrect prediction with a previously seen sequence. This prediction is made using the parameters above and the table as follows:
 1. Determine the positive counts for the string;
 2. Determine the negative counts for the string;
 3. Compute the ratio of the positive counts to negative counts for the string;
 4. If this ratio is greater than the predetermined threshold p (0.5 in this case), predict that a switch will occur; otherwise predict that a switch will not occur.

A switch does not occur, however as the next action in the session string is "Q," so the prediction of a switch is incorrect. In response, the positive/negative counts table is updated to reflect this mistake and becomes:

| String | Positive Counts | Negative Counts |
|--------|-----------------|-----------------|
| QRYHY  | 1               | 0               |
| QLQRY  | 1               | 0               |
| QDQDQ  | 2               | 4           |
| QRQRQ  | 1               | 5               |
| ...    | ...             | ...             |

The changed value is shown in the table in bold font.

In the second example, the algorithm predicts a switch after "QDQLQ." This is an example of an incorrect prediction with a previously unseen sequence. This prediction is made using the parameters above and the table as follows:

This sequence never appears in the sessions processed during the initialization step or previously in this session. Since this sequence is unseen there is no evidence to support or refute a prediction of a switch. In this case, the most frequent (likely) overall outcome is used as the prediction. Therefore, since a negative result is more frequent (total positive counts in previous table=5, total negative counts=9) the algorithm predicts that the user is not going to switch).

A switch does not occur, however, as the observed next action in the session string is "Y" (a switch), so the prediction is incorrect. In response, the positive/negative counts table is updated to reflect this mistake. The table is updated by adding a new row for "QRYHY" and incrementing the value of positive counts to reflect that a switch did follow it as indicated below:

| String | Positive Counts | Negative Counts |
|--------|-----------------|-----------------|
| QRYHY  | 1           | 0               |
| QLQRY  | 1               | 0               |
| QDQDQ  | 2               | 4               |
| QRQRQ  | 1               | 5               |
| QDQLQ  | 1               | 0               |
| ...    | ...             | ...             |

The changed value is shown in the table in bold font.

In the third example, the algorithm predicts a switch after "QLQRY." This is an example of correct prediction with a previously seen sequence. This prediction is made using the parameters above and the table as follows:
 1. Determine the positive counts for the string;
 2. Determine the negative counts for the string;
 3. Compute the ratio of the positive counts to negative counts for the string. Note that in this case, the ratio will be infinite meaning that in the past this sequence has always been followed by a switch. In one embodiment, if the positive counts are greater than zero and the negative counts are zero, a ratio may not be computed. Instead a positive prediction of switch may be returned; and
 4. If this ratio is greater than the predetermined threshold p (0.5 in this case), predict that a switch will occur; otherwise predict that a switch will not occur.

In this example, a switch does occur as the next character is "Y," so the prediction is correct. In response, the positive/negative counts table is updated to reflect the correct prediction as follows:

| String | Positive Counts | Negative Counts |
|--------|-----------------|-----------------|
| QRYHY  | 1               | 0               |
| QLQRY  | 2           | 0               |
| QDQDQ  | 2               | 4               |
| QRQRQ  | 1               | 5               |
| QDQLQ  | 1               | 0               |
| ...    | ...             | ...             |

The changed value is shown in the table in bold font.

Through modifying the table during the prediction step as well as during the initialization step, the algorithm gains valuable additional data on previously unseen interaction patterns that can be used to improve future predictive power. In another embodiment, however, the algorithm may not update the table with each new seen pattern or may update the table periodically or as indicated by a system administrator or the like.

Note that the operational instantiations of the tables in this example will likely contain values for the positive and negative counts that are several orders of magnitude larger than those shown here. The small counts shown here are purely for illustrative purposes and are not meant to depict expected values in the tables.

Above has been described an algorithm for predicting whether or not a search engine user is going to switch engines based on search strings generated from behavioral patterns captured by interaction logs. This algorithm is only one possible technique for predicting search engine switches. Other embodiments for predicting search engine switches involve changing features and/or algorithms.

For example, with respect to features, more information may be encoded in the string representation or in another form. Such information may include, for example:

1. User: Features for a particular user may be used for personalization. Possible features include predominant search engine, previous switching behavior, and normalization by typical behavior (e.g., session length, query reformulation rate, and the like).

2. Query: Features of the query such as the popularity or distribution of the words that appear in the query, similarity between subsequent queries, query length, the number of query iterations, popularity of a query overall, actual words in the query (for popular words), navigational query status (i.e., queries that are intended to find a particular site), and estimated clickthrough rate.

3. Session (as defined previously herein or otherwise): Features of the interaction such as the number of branches on a post-query navigation trail, average page display times, number of times the "back" button is clicked, the number of steps on the post-query navigation trail, the number of results returned by the originating search engine, the overlap among results, and the like.

Different algorithms may also be used to predict switching. Some exemplary algorithms include:

1. Machine Learning: The session features identified in, and possibly others, may be inserted into a supervised machine learning algorithm such as a Support Vector Machines (SVM) that can learn features based on labeled data and predict whether a switch between engines is going to occur.

2. Nth-order Markov models and Nth-order Hidden Markov Models The letters used to encode page views and user actions may be regarded as states in a Markov model and the state transitions based on the frequency with which one state follows another. For any given search session, these models may be used predict the next state based on the history of interaction for all sessions or a given session. A Hidden Markov Model (HMM) may be used to predict when a search engine switch is going to occur and also give insight into what additional (e.g., hidden) factors may influence switching decisions.

3. The use of other similar approaches such as Bayesian nets is also plausible, as is also developing models personalized for the user and tailored to the query or the active search task. There are many possible machine learning approaches to predicting sequence information, which may or may not be applicable to predicting switching behavior. For example, an approach may have high accuracy but may not be applicable if the algorithm does not meet efficiency requirements for a real-time application. The above descriptions are intended merely as examples of possible approaches.

Uses of Search Engine Switching Information

Given a means of predicting a switch or simply being able to count the number of switches aggregated by user or by query following are some examples of how this information can be applied:

1. Switches to a given search engine (e.g., from any other search engine to Google);

2. Switches from a given search engine (e.g., from Google to any other search engine);

3. Supporting switching behavior; and

4. Switches as a means of estimating search engine performance.

Switches to a given search engine. A part of the search experience is the speed with which the search engine retrieves and presents results to users. If an algorithm can accurately predict when a user is going to switch from one engine to another, the contents of the pages the user has viewed during the search session so far, and the queries the user has submitted may be used to build an enhanced model of interests. This model may be used to proactively retrieve a new set of search results on the engine being switched to.

Building the model and retrieving the new set of search results may happen before the user makes the decision to switch to another search engine, reducing load time of the result page and improving relevance. In addition to just pre-caching the search engine results, a component may also begin to download the most likely documents to be visited in the top results, saving the user additional time if the user does decide to switch.

Also, with knowledge of what documents the user has already viewed on the other engine prior to switching, in one embodiment, the component may discount (or even exclude) these pages from the ranking on the new search engine. Although excluding the pages may reduce redundancy, it may also adversely affect user's perceptions of the target engine if the top-ranked documents on the competitor search engine the user just switched from were not present in the new ranking. To counter this problem, the component may give a user the option to include/exclude pages already seen using the other search engine.

The component may be implemented as a plug-in to a toolbar (i.e., client-side) or as a server-side feature whereby the interaction events from many users are processed on the server rather than being written to a log file. The server-side approach allows the user to use these features without downloading and installing the component. The user model developed on the server may then be used when furnishing result sets as well as advertising tailored to that particular user. Tailoring online advertising in this way is potentially easier than on the client-side since there is no need to do processing on the client's machine.

Switches from a given search engine. From a search engine's perspective, switching away from a given search engine represents a prospective loss in terms of advertising revenue and a potential gain for competitors. As such, search engine switching (at least away from a given engine) may be discouraged. If an algorithm can predict that a user is likely to switch away from a given search engine, this prediction may be used, for example, to:

1. Devote more computational resources to processing the user's queries so that relevant information will be more likely to be surfaced.

2. Provide the user with new ways to order the results based on novelty in the current session and more approximate matches to the user's query (and a way to control this approximation), since it may be the case that the user is not finding relevant information because the user's query is too broad or too specific.

3. Offer personalized search results based on a user profile created from the user's recent search history, all of the user's search history, some combination of the user's Web search history, general Web browsing history, and perhaps even the information stored in the user's local machine, and the like.

4. Offer a radically different search experience by providing the option to engage in a real-time chat with a search associate who could help the user with the user's search. Other possibilities include different search interfaces, such as those based on categorized overviews, query facets, two- or three-dimensional information visualization techniques, other techniques, and the like.

Support for switching. A tool may facilitate switching between multiple engines. For example, a toolbar plugin may track user behavior and attempt to predict when a user is going to switch. The tool may submit the current query to a user's preferred engine but when the tool detects that the user is going to switch, it may relay the same query to other engines previously specified. As a user browses the results of a preferred engine the tool may highlight and potentially re-query other engines for unread documents that are potentially relevant. The tool may then give the user the option to view the result set of the other engine, either in a separate browser tab or in a new browser window. The tool may proactively support the use of multiple engines by closely coupling querying on a user's favorite engine with querying on rival engines.

Switching as a measure of user dissatisfaction. Switching from one search engine to another and issuing the same query is an indication that a user is dissatisfied with the results obtained from the first engine. Through the mechanisms described above a list of queries may be built offline that leads to the greatest number of predicted switches. This would be based on interaction logs and may be used to obtain a measure of user dissatisfaction that can be used to measure search engine performance for individual queries and across all queries. If this correlates with current measures such as Precision, Recall, and Discounted Cumulative Gain (described below), then it may be used as a cost-effective way to determine the queries for which performance needs to improve, with potentially greater coverage than a human assessment effort. This would be of most use if search engine designers did not have access to logs of what users did once they leave their search engine (i.e., they cannot be sure that users switch but could predict whether they did based on patterns of interaction with their engine).

Discounted Cumulative Gain (DCG) is a measure of relevance. "Discounted" means that urls further down the list have less influence on the measure which means that the top few results matter the most. "Cumulative" means that it is a measure over the top N results, not just one result. "Gain" means that larger is better. This is often encountered as NDCG, where the N means "normalized", meaning that for a given query, the DCG is divided by the max DCG possible for that query. The NDCG therefore takes values in the range [0,1].

This type of analysis may also be used to determine the defection rate of users who switch for long periods of time, or even indefinitely, and generate potential explanations for why these users switch that could be useful in supporting marketing or design decisions. In addition, switches may also be visualized on a timeline, or other graphical representation, as part of a diagnostic tool to assess the impact of search engine releases, for example.

Again, the uses of switching information described above are exemplary and are not intended to be all-inclusive or exhaustive. Indeed, based on the teachings herein, those of skill in the art will recognize many other uses for search engine switching information. Such other uses also fall under the spirit and scope of aspects of the subject matter described herein.

Figure 2:
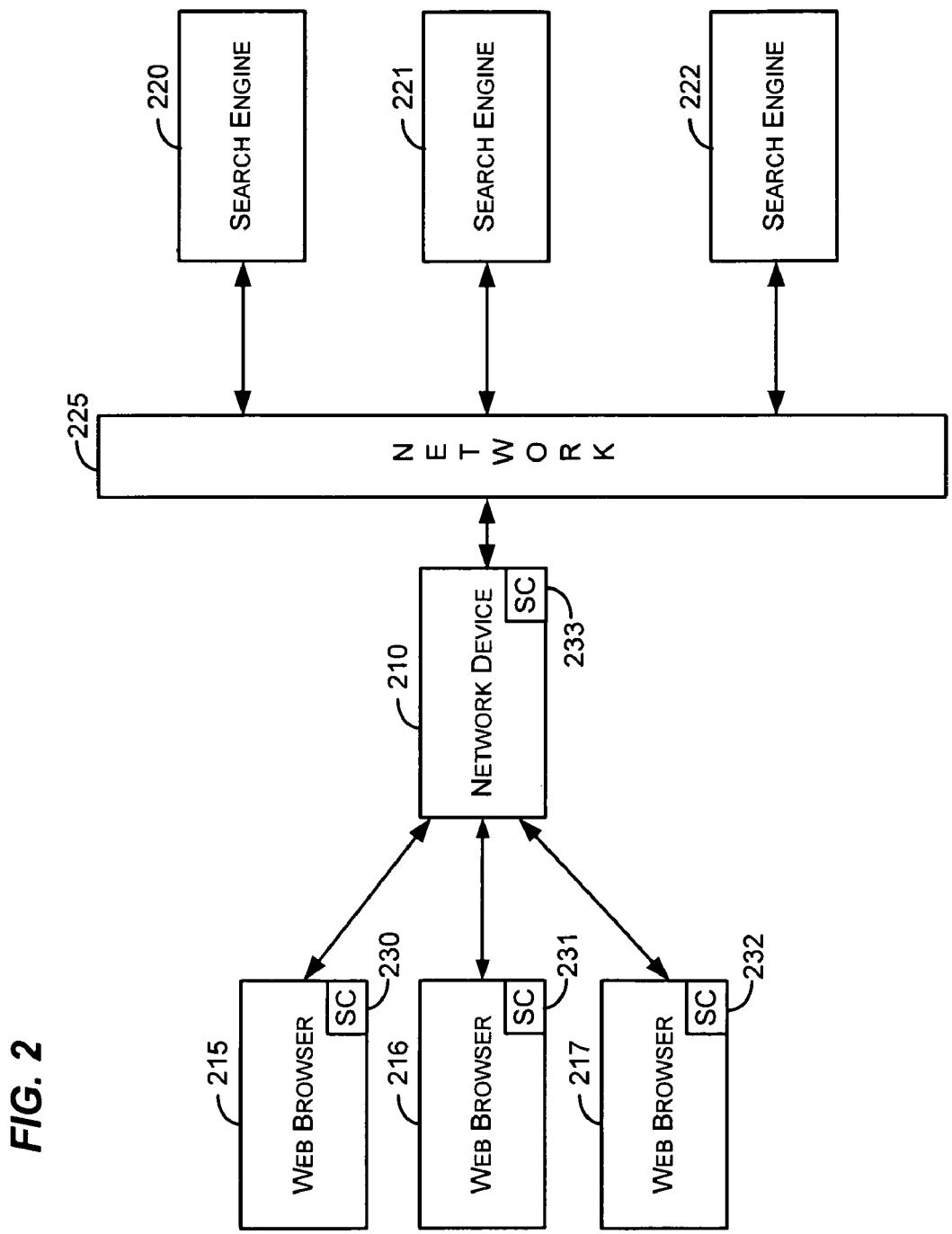
FIG. 2 is a block diagram representing an exemplary environment in which aspects of the subject matter described herein may be implemented.

FIG. 2 is a block diagram representing an exemplary environment in which aspects of the subject matter described herein may be implemented. The environment includes a network device 210, web browsers 215-218, search engines 220-222, and a network 225 and may include other entities (not shown). The various entities may communicate with each other via various networks including intra- and inter-office networks and the network 225. In an embodiment, the network 225 may comprise the Internet. In an embodiment, the network 225 may comprise one or more private networks, virtual private networks, or the like. The Web browsers 215-217, the devices hosting the Web browsers 215-217, and/or the network device 210 may include switching components 230-233, respectively.

Each of the Web browsers 215-217 and the search engines 220-222 may be hosted on one or more computers (e.g., the computer 110 as described in conjunction with FIG. 1). The Web browsers 215-217 may submit queries to and receive results from any of the search engines 220-222. Communications to and from the Web browsers may pass through the network device 210

The network device 210 may comprise a firewall, router, bridge, computer (e.g., such as the computer 110 of FIG. 1), or the like. The network device 210 may receive packets to and from the Web browsers 215-217.

The switching components 230-233 may include logic and data that predict when a user is going to switch search engines. This logic and data may comprise the logic and data described previously. Each switching component may monitor user interaction with search engines.

In one embodiment, the switching component 233 on the network device is optional. When the switching component 233 is present, the switching components 230-232 may be omitted as the switching component 233 may monitor user interactions, predict search engine switches, and use this switching information as appropriate to encourage or discourage a switch as indicated previously. Instead of a toolbar built into a browser, the network device 210 may provide the same functionality in a button or other user interface element presented in a page displayed by a Web browser.

Although the environment described above includes a network device, web browsers, and search engines in various configurations, it will be recognized that more, fewer, and/or a different combination of these and other entities may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 3:
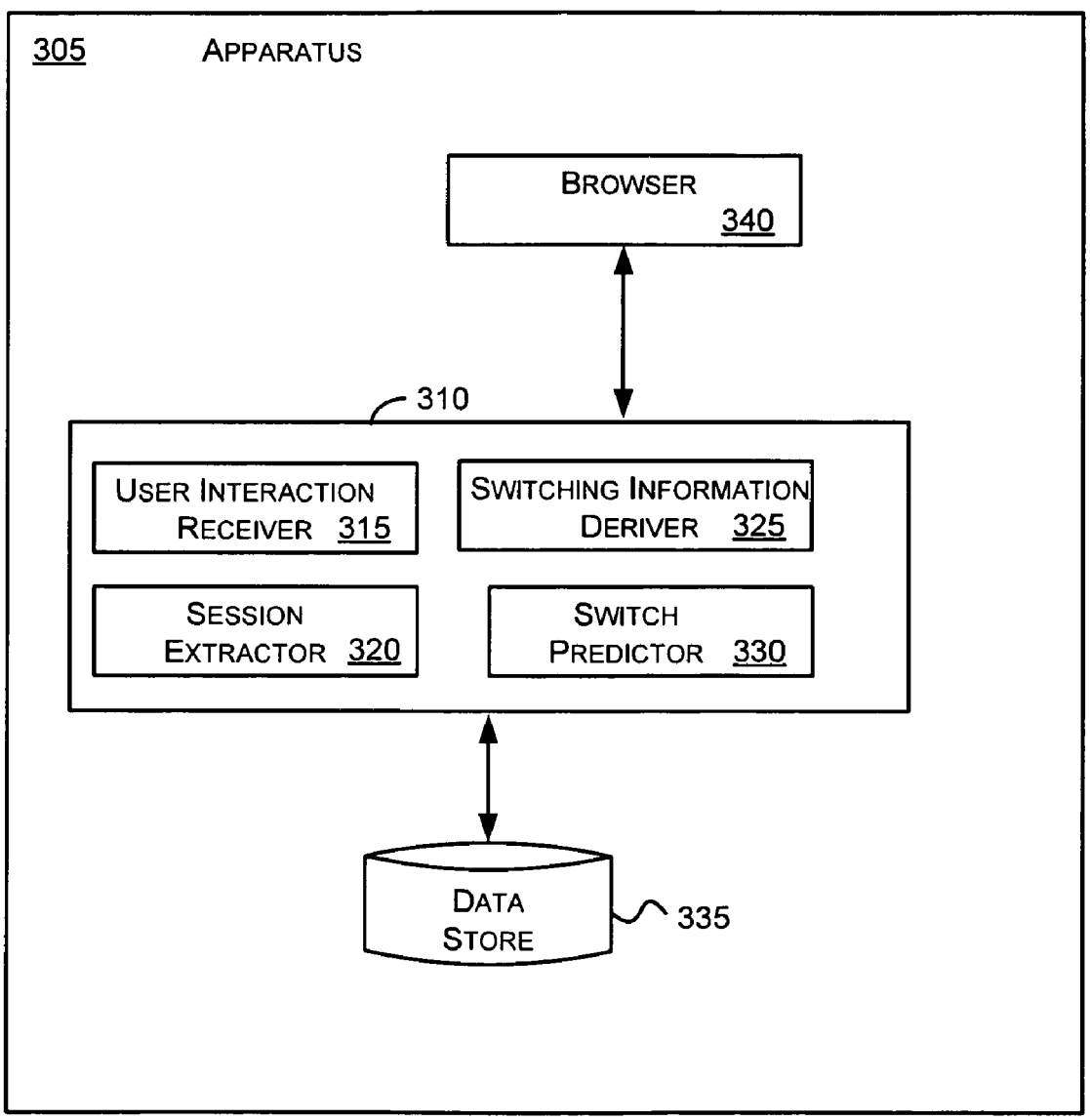
FIG. 3 is a block diagram illustrating an apparatus configured to predict search engine switches in accordance with aspects of the subject matter described herein.

FIG. 3 is a block diagram illustrating an apparatus configured to predict search engine switches in accordance with aspects of the subject matter described herein. The components illustrated in FIG. 3 are exemplary and are not meant to be all-inclusive of components that may be needed or included. In other embodiments, the components or functions described in conjunction with FIG. 3 may be included in other components or placed in subcomponents without departing from the spirit or scope of aspects of the subject matter described herein.

Turning to FIG. 3, the apparatus 305 may include switching components 310 and a data store 335. The switching components 310 may include a user interaction receiver 315, a session extractor 320, a switching information deriver 325; and a switch predictor 330. Although in one embodiment, the switching components 310 may reside on the apparatus 305, in other components, one or more of these components may reside on other devices. For example, one or more of these components may be provided as services by one or more other devices. In this configuration, the apparatus 305 may cause the functions of these components to be performed by interacting with the services on the one or more other devices and providing pertinent information.

The user interaction receiver 315 is operable to obtain a representation of user interaction with a browser. This representation may include, for example, addresses of sites visited, information typed in an address bar or elsewhere, results received from a search engine, keystrokes and mouse clicks, other interaction information, and the like.

The session extractor 320 is operable to identify session information in the representation of user interaction. For example, the session extractor 320 may extract search information and related Web page viewing performed by one or more users. The session extractor 320 may also encode this information into a form more suitable for predicting switches. For example, the session extractor 320 may translate the addresses of the Web pages viewed and searches performed into a sequence of characters in the format described previously.

The switching information deriver 325 is operable to obtain switching information from the session information. For example, the switching information deriver 325 may update a Positive/Negative counts table as indicated previously. The switching information deriver 325 may update one or more data structures in the data store 335 in conjunction with obtaining the switching information from the session information.

The switch predictor 330 is operable to predict whether a user is going to switch from one search engine to another. Being able to predict that a user is going to switch from one search engine to another does not necessarily mean being able to determine the search engine to which the user is switching. In other words, at a minimum, the search engine predictor 330 is able to predict that the user is going to switch from a current search engine to another search engine, even if the search engine predictor 330 is not able to predict what the other search engine is.

The switch predictor 330 uses the switching information generated by the switching information deriver 325 together with information about a current interaction with a user to predict whether a switch will occur. The switch predictor 330 may use various algorithms including those that have been described previously to predict search engine switches.

The data store 335 comprises any storage media capable of storing switching information. The data store 335 may comprise a file system, database, volatile memory such as RAM, other storage, some combination of the above, and the like and may be distributed across multiple devices. The data store 335 may be external or internal to the apparatus 305.

The browser 340 comprises one or more software components that allow a user to access resources (e.g., search engines, Web pages) on a network (e.g., the Internet). In one embodiment, the browser 340 may include the switching components 310 as a plug-in, for example.

Figure 4:
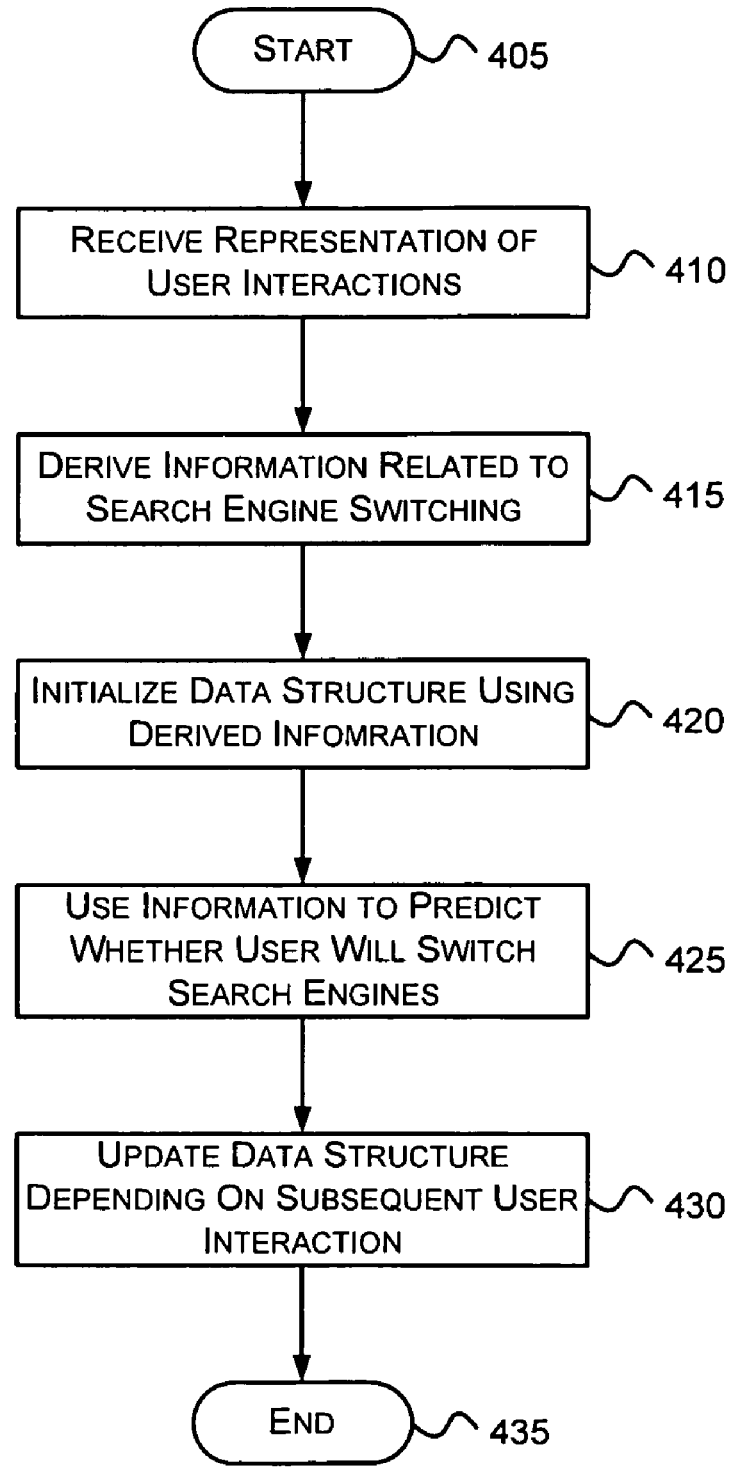
FIGS. 4-5 are flow diagrams that generally represent exemplary actions that may occur in predicting and using predictions of switching in accordance with aspects of the subject matter described herein.
Figure 5:
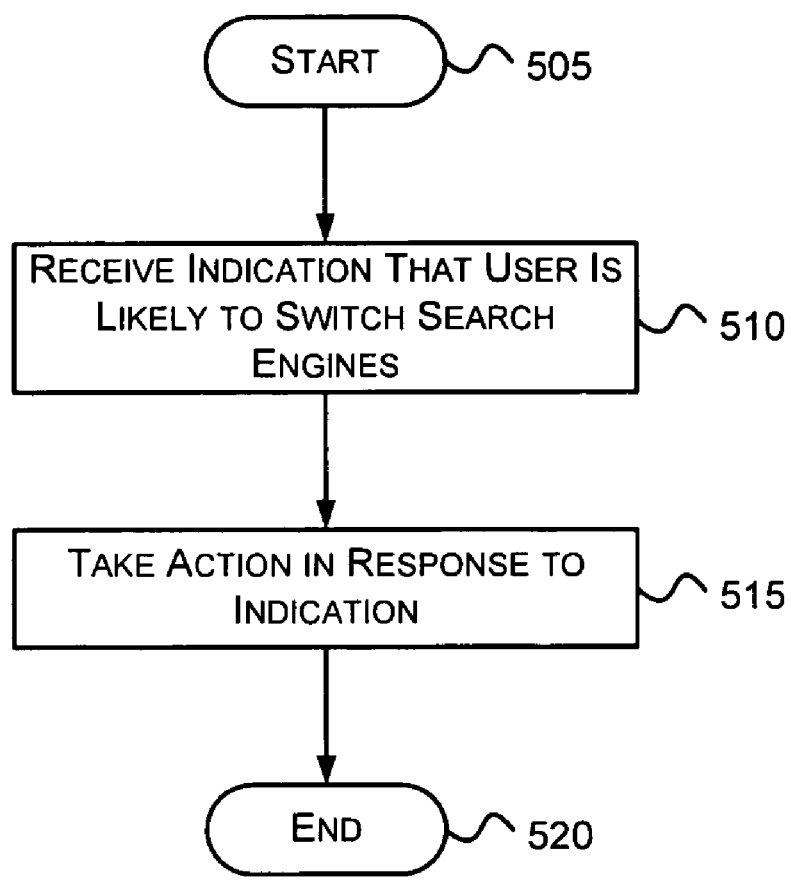

FIGS. 4-5 are flow diagrams that generally represent exemplary actions that may occur in predicting and using predictions of switching in accordance with aspects of the subject matter described herein. For simplicity of explanation, the methodology described in conjunction with FIGS. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 4, at block 405, the actions begin. At block 410, a representation of user interactions is received. For example, referring to FIG. 3, the user interaction receiver 315 may receive a representation of user interactions.

At block 415, information related to search engine switching is derived. For example, referring to FIG. 3, the session extractor 320 creates a string from the representation of user interactions.

At block 420, a data structure is initialized using the derived information. For example, referring to FIG. 3, the switching information deriver 325 updates a data structure in the data store 335 with strings received from the session extractor 320.

At block 425, the information and information about current user interaction with a Web browser is used to predict whether a user will switch search engines. For example, referring to FIG. 3, the switch predictor 330 uses the data structure included in the data store 335 and also uses information about current user interaction with the browser 340 to predict whether the user will switch search engines.

At block 430, a data structure is updated depending on subsequent user interaction. For example, referring to FIG. 3, a data structure in the data store 335 is updated to indicate what the user actually did (e.g., switched or did not switch).

At block 435, the actions end.

Turning to FIG. 5, at block 505, the actions begin. At block 410, an indication is received that a user is likely to switch search engines. For example, referring to FIG. 3, the switch predictor 330 provides an indication of likely search engine switch to a component (not shown).

At block 515, an action is taken in response to the indication of likely search engine switch. The action may include any of the actions describe previously. Some of these actions include, for example:

1. Retrieving a new set of search results prior to the user switching.

2. Beginning to downloading documents indicated in the new set of search results prior to the user switching to make the users experience when switching more positive.

3. Eliminating items in the set of search results that have already been selected by the user prior to switching.

4. Devoting more computational resources to processing queries issued by the user, providing an additional way to order results, providing a mechanism to control retrieval of approximate matches terms in the queries, providing search results based on information maintained about the user, offering to provide access to a search associate, and providing a multi-dimensional visualization of a set of search results.

5. Providing support for the switch. This may include making it easier to switch to another search engine, for example.

6. Determining a performance issue in a search engine based on information related to the switch. For example, if many users tend to switch search engines after a particular query, this may indicate that the search engine has a problem with retrieving information for the query.

The above actions are exemplary and are not intended to be all-inclusive or exhaustive. Indeed, based on the teachings herein, those skilled in the art may recognize may other actions that may be take in response to receiving an indication of search engine switch without departing from the spirit or scope of aspects of the subject matter described herein.

At block 520, the actions end.

As can be seen from the foregoing detailed description, aspects have been described related to predicting and using search engine switching behavior. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
    receiving a representation of user interactions with at least one browser, wherein the representation comprises a consecutive series of Web pages visited by the user, the consecutive series starting with a search engine result page and ending with an activity assumed unrelated to a current search;
    deriving first information related to search engine switching from the representation; and
    using the first information and second information derived from a set of one or more interactions of a user with a browser to predict whether the user will switch search engines.

2. The method of claim 1, wherein the browser comprises an Internet browser capable of retrieving data from and providing data to an entity connected to the Internet.

3. The method of claim 1, wherein deriving first information related to search engine switching comprises encoding the representation into one or more strings representing user actions and other information about the user interaction with the browser.

4. The method of claim 3, wherein the user actions comprise one or more actions including query performed, clicked on result link, clicked on non-result link, went back one page, went back more than one page, navigated to a new page, and switched search engine.

5. The method of claim 3, wherein the other information includes an indication of how much time was spent viewing a page.

6. The method of claim 5, wherein the other information further includes whether the time was short, medium, or long with respect to other user interactions with pages.

7. The method of claim 1, further comprising updating a data structure that includes a first value that indicates a number of times that a sequence of interactions is followed by a search engine switch and a second value that indicates a number of times that the sequence is not followed by a search engine switch.

8. The method of claim 7, wherein using the first information and second information to predict whether the user will switch search engines comprises:
    computing a ratio of the first value to the second value;
    comparing the ratio against a threshold;
    if the ratio is greater than the threshold, predicting that the user will switch search engines; and
    if the ratio is not greater than the threshold, predicting that the user will not switch search engines.

9. The method of claim 1, wherein using the first information and the second information to predict whether the user will switch search engines comprises applying a supervised machine learning algorithm.

10. The method of claim 1, wherein using the first information and the second information to predict whether the user will switch search engines comprises using a Markov model.

11. A computer storage medium storing computer-executable instructions that, when executed by a computer, cause the computer to perform actions comprising:
    receiving an indication that a user is likely to switch search engines, the indication being generated automatically by a component that predicts when a user is likely to switch search engines; and
    taking an action in response to the indication, wherein the taking the action comprises providing support for the switch.

12. The computer storage medium of claim 11, wherein taking an action in response to the indication comprises retrieving a new set of search results prior to the user switching.

13. The computer storage medium of claim 12, wherein taking an action in response to the indication further comprises beginning to download documents indicated in the search results prior to the user switching.

14. The computer storage medium of claim 12, wherein taking an action in response to the indication further comprises eliminating items in the set of search results that have already been selected by the user prior to switching.

15. The computer storage medium of claim 11, wherein taking an action in response to the indication comprises one or more actions including devoting more computational resources to processing queries issued by the user, providing an additional way to order results, providing a mechanism to control retrieval of approximate matches terms in the queries, providing search results based on information maintained about the user, offering to provide access to a search associate, and providing a multi-dimensional visualization of a search result.

16. The computer storage medium of claim 11, wherein taking an action in response to the indication comprises determining a performance issue in a search engine based on information related to the switch.

17. In a computing environment, an apparatus, comprising:
    a receiver configured to obtain a representation of user interaction with a browser, wherein the representation comprises a consecutive series of Web pages visited by the user, the consecutive series starting with a search engine result page and ending with an activity assumed unrelated to a current search;
    a session extractor configured to identify session information in the representation;
    a deriver configured to obtain switching information from the session information; and
    a switch predictor configured to predict using at least the switching information and interaction of a user with a browser whether the user is going to switch from one search engine to another.

18. The apparatus of claim 17, wherein the session extractor is further operable to encode the session information in a string that indicates the consecutive series of Web pages visited by the user.

* * * * *